(12) United States Patent
Cruz-Albrecht et al.

(10) Patent No.: US 8,959,040 B1
(45) Date of Patent: Feb. 17, 2015

(54) SPIKE TIMING DEPENDENT PLASTICITY APPARATUS, SYSTEM AND METHOD

(75) Inventors: Jose Cruz-Albrecht, Oak Park, CA (US); Peter Petre, Oak Park, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 412 days.

(21) Appl. No.: 13/415,812

(22) Filed: Mar. 8, 2012

(51) Int. Cl.
*G06N 3/00* (2006.01)
*G06G 7/00* (2006.01)
*G06N 3/063* (2006.01)
*G06N 3/06* (2006.01)

(52) U.S. Cl.
CPC .............. *G06N 3/0635* (2013.01); *G06N 3/06* (2013.01)
USPC ........................................................ 706/39

(58) Field of Classification Search
CPC .......... G06N 3/04; G06N 3/06; G06N 3/0635
USPC .................................... 706/26, 27, 33, 38, 39
See application file for complete search history.

(56) References Cited

U.S. PATENT DOCUMENTS

| | | | |
|---|---|---|---|
| 5,274,748 A | 12/1993 | Boser et al. | |
| 2005/0137993 A1* | 6/2005 | Poon | 706/26 |
| 2010/0076916 A1* | 3/2010 | van der Made | 706/27 |
| 2012/0150781 A1* | 6/2012 | Arthur et al. | 706/35 |
| 2013/0117213 A1* | 5/2013 | Hunzinger et al. | 706/25 |

OTHER PUBLICATIONS

Koickal, T.J. et al. "Bio-inspired event coded configurable analog circuit block." Evolvable Systems: From Biology to Hardware. LNCS vol. 5216. Springer Berlin Heidelberg, 2008. pp. 285-295.*
Lennie, P., "The Cost of Cortical Computation," Current Biology, vol. 13, pp. 493-497, Mar. 2003.
Attwell, D., et al., "An Energy Budget for Signaling in the Gray Matter of the Brain," Journal of Cerebral Blood Flow and Metabolism, vol. 21, pp. 1133-1145, 2001.
Sharpeskhar, R., Ultra-low power BioElectronics: Fundamentals, Biomedical Applications and Bio-Inspired Systems, Cambridge University Press, 2010, 16 pages. Front matter (e.g. abstract, contents) only.
Yu, T., et al., "Analog VLSI Biophysical Neurons and Synapses with Programmable Membrane Channel Kinetics," IEEE Trans. Biomed. Circuits Syst., vol. 3, No. 4, pp. 139-148, Jun. 2010.

(Continued)

*Primary Examiner* — Alan Chen
*Assistant Examiner* — Benjamin Buss
(74) *Attorney, Agent, or Firm* — North Shore Associates

(57) ABSTRACT

A spike timing dependent plasticity (STDP) apparatus, neuromorphic synapse system and a method provide STDP processing of spike signals. The STDP apparatus includes a first leaky integrator to receive a first spike signal and a second leaky integrator to receive a second spike signal. An output of the first leaky integrator is gated according to the second spike signal to produce a first gated integrated signal and an output of the second leaky integrator is gated according to the first spike signal to produce a second gated integrated signal. The STDP apparatus further includes an output integrator to integrate a difference of the first and second gated integrated signals to produce a weighted signal. The system includes a synapse core and the STDP apparatus. The method includes integrating the spike signals, gating the integrated signals and integrating a difference of the gated integrated signals.

21 Claims, 4 Drawing Sheets

(56) References Cited

OTHER PUBLICATIONS

Indiveri, G., "Neuromorphic Bistable VLSI Synapses with Spike-Timing-Dependent Plasticity, in Advances in Neural Information Processing Systems," vol. 15, MIT Press, Cambridge, MA, Dec. 2002, 8 pages.
Veendrick, H., Nanometer CMOS ICs: From Basics to ASICs, Springer, 2008, 31 pages. Front matter (e.g. preface, contents) only.
Hodgkin, A. L., et al., "A quantitative description of membrane current and application to conduction and excitation in nerve," Journal of Physiology, vol. 117, pp. 500-544, 1952.
Farquhar, E., et al., "A Bio-Physically Inspired Neuron Model," IEEE Trans. On Circuits and Systems, vol. 52, No. 3, pp. 477-488, 2005.
Izhikevich, E., "Which model to use for cortical spiking neurons," IEEE Transactions on Neural Networks, vol. 15, No. 5, pp. 1063-1070, 2004.
Fitzhugh, R., "Impulses and Physiological States in Theoretical Models of Nerve Membrane," Biophysical Journal, vol. 1, pp. 445-466, 1961.
Brette R., et al., "Adaptive Exponential Integrate and Fire Model as an Effective Description of Neuronal Activity," Journal of Neurophysiology, vol. 94, pp. 3637-3642, 2005.
Vogels, T. P., et al., "Neural Network Dynamics," Annual Review Neuroscience, vol. 28, pp. 357-376, 2005.
Gerstner, W., et al., Spiking Neuron Models—Single Neurons, Populations, Plasticity, Cambridge University Press, 2002, 13 pages. Front matter (e.g. abstract, contents, preface) only.
Indiveri, G., "A Low-Power Adaptive Integrate-and-Fire Neuron Circuit," in Proc. 2003 Intl. Symp. on Circuits and Systems (ISCAS), vol. IV, pp. 820-823, Jun. 2003.
Wei, D., et al., "Signal reconstruction from spiking neuron models" in Proc. 2004 Intl. Symp. on Circuits and Systems (ISCAS), vol. V, pp. 353-356, 2004.
Lazar, A. A., et al., "Perfect Recovery and Sensitivity Analysis of Time Encoded Bandlimited Signals," IEEE Trans. on Circuits and Systems—I, vol. 51, No. 10, pp. 2060-2073, Oct. 2004.
Lazar, A. A., "Time Encoding with an Integrate-and-Fire Neuron with a Refractory Period," Neurocomputing, vo. 58-60, pp. 53-58, Jun. 2004.
Markram, H., et al., "Regulation of synaptic efficacy by coincidence of postsynaptic APs and EPSPs," Science, vol. 275, pp. 213-215, 1997.
Bi, G. Q., et al., "Synaptic Modifications in Cultured hippocampal neurons: dependence on spike timing, synaptic strength and cell type," J. Neuroscience. vol. 18, pp. 10464-10472, 1998.
MaGee, J. C., et al., "A synaptically controlled, associative signal for Hebbian plasticity in hippocampal neurons," Science vol. 275, pp. 209-213, 1997.

Pfister, Jean-Pascal, et al., "Triplets of Spikes in a Model of Spike Timing-Dependent Plasticity," Journal of Neuroscience, vol. 26, pp. 9673-9682, 2006.
Song, S., et al., "Competitive Hebbian Learning Through Spike-Timing Dependent Synaptic Plasticity," Nature Neuroscience, vol. 3 pp. 919-926, 2000.
Folowosele, F., et al., "A Switched Capacitor Implementation of the Generalized Linear Integrate-And-Fire Neuron," in Proc. 2009 Intl. Symp. on Circuits and Systems (ISCAS), pp. 2149-2152 , 2009.
Wijekoon, J. H., et al., "Integrated Circuit Implementation of a Cortical Neuron," in Proc. 2008 Intl. Symp. on Circuits and Systems (ISCAS), vol. IV, pp. 1784-1787, Jun. 2008.
Indiveri, G., et al., "A VLSI Array of Low Power Spiking Neurons and Bistable Synapses with Spike Timing Dependent Plasticity," IEEE Trans. On Neural Networks, vo. 17, No. 1, pp. 211-221, Jan. 2006.
Lee, Y. J., "Low Power Real Time Electronic Neuron VLSI Design using Subthreshold Technique," in Proc. 2004 Intl. Symp. on Circuits and Systems (ISCAS), vol. IV, pp. 744-747, 2004.
Lazzaro, J., "Low-Power Silicon Spiking Neurons and Axons," IEEE Symposium on Circuits and Systems, pp. 2220-2223, 1992.
Tanaka, H., et al., "A CMOS Spiking Neural Network Circuit with Symmetric/Asymmetric STDP Function," IEICE Tran. on Fundamentals of Electronics, Communications and Computer Sciences, vol. E92-A No. 7, pp. 1690-1698, Jul. 2009.
Bofill-I-Petit, A., et al., "Synchrony Detection and Amplification by Silicon Neurons with STDP Synapses," IEEE Trans. Neural Netw., vol. 15, No. 5, pp. 1296-1304, Sep. 2004.
Koickal, T. J., et al., Analog VLSI Circuit Implementation of an Adaptive Neuromorphic Olfaction Chip, IEEE Trans. Circuits Syst I: Reg. Papers, vol. 54, No. 1, pp. 60-73, Jan. 2007.
Linares-Barranco, B., et al., "Hysteresis Based Neural Oscillator for VLSI Implementations," Proc. 1991 Intl. Symp. on Circuits and Systems (ISCAS), vol. III, pp. 1465-1468, Jun. 1991.
Zhang, Q Lai, L., et al., "Configurable Neural Phase Shifter with Spike-Timing-Dependent Plasticity," IEEE Electron Device Letters, vol. 31, No. 7, pp. 716-718, Jul. 2010.
Jo, S. H., et al., "Nanoscale Memristor Device as Synapse in Neuromorphic Systems," Nano Letters, vo. 10, No. 4, pp. 1297-1301, 2010.
Ramakrishnan, S., et al., "Spike-Time-Dependent Plasticity," IEEE Trans. on Biomedical Circuits and Systems, vol. 5, No. 3, pp. 244-252, Jun. 2011.
Pankaala, M., et al., "Compact Floating-gate Learning Array with STDP," Proc. of Intl. Joint Conf. on Neural Networks, Atlanta, Georgia, USA, pp. 2409-2415, Jun. 2009.
Indiveri, G., et al., "Neuromorphic Silicon Neuron Circuits," Frontiers in Neuroscience, vol. 5, Article 73, pp. 1-23, May 2011.

* cited by examiner

US 8,959,040 B1

SPIKE TIMING DEPENDENT PLASTICITY APPARATUS, SYSTEM AND METHOD

STATEMENT REGARDING FEDERALLY SPONSORED RESEARCH OR DEVELOPMENT

This invention was made with Government support under Contract No. HRL0011-09-C-0001 awarded by DARPA. The Government has certain rights in the invention.

CROSS-REFERENCE TO RELATED APPLICATIONS

N/A

BACKGROUND

1. Technical Field

The invention relates to analog circuits, systems and related signal processing. In particular, the invention relates to elements and processing used in synapses of biologically inspired neuromorphic circuits and systems.

2. Description of Related Art

Complex, real-time and near real-time processing and control applications are becoming more and more commonplace and important. Examples include, but are not limited to, real-time image processing, as well as processing data, from a large array of sensors (e.g., a focal plane array of optical sensors) that may involve simultaneous processing of multiple, parallel channels from the sensor array. Such real-time processing often presents significant design challenges including, but not limited to, providing implementations that have sufficient processing power and at the same time exhibit reasonable energy efficiency. Neuromorphic circuits and related circuit topologies may offer a solution to some of these significant obstacles associated with the design and implementation of real-time processing and control.

Neuromorphic circuits are electronic circuits that mimic the operation of cell populations within a nervous system and as such, may offer a number of advantages for robust signal processing in support of various real-time control and sensor processing applications. In particular, neuromorphic circuits may facilitate robust signal processing in a manner that mimics certain populations of neural cells including, but not limited to, populations of neural cells found in the brain of an animal, for example. As an animal's brain is generally adept at processing and interpreting a barrage of signals received from an animal's environment in a robust and energy efficient manner, so too are various neuromorphic circuits that mimic brain-like functions. Specifically, the neuromorphic circuit may perform various brain-like functions in a manner substantially similar to, or at least modeled on, its biological counterpart. However, the challenge remains to develop practical implementations of neuromorphic circuits and more particularly, low-power integrated circuit implementations thereof, that can be applied to real-time control and processing systems.

BRIEF SUMMARY

In some examples, a spike timing dependent plasticity (STDP) apparatus is provided. The STDP apparatus comprises a first leaky integrator to receive a first spike signal. An output of the first leaky integrator is gated to produce a first gated integrated signal. The STDP apparatus further comprises a second leaky integrator to receive a second spike signal. An output of the second leaky integrator is gated to produce a second gated integrated signal. The STDP apparatus further comprises an output integrator to integrate a difference of the first gated integrated signal and the second gated integrated signal and to produce a weighted signal at an output of the STDP apparatus. The first leaky integrator output is gated according to the second spike signal and the second leaky integrator output is gated according to the first spike signal.

In some examples, a neuromorphic synapse system is provided. The neuromorphic synapse system comprises a synapse core to receive a pre-synaptic spike signal and to produce a weighted spike signal. The weighted spike signal is weighted in accordance with a weight signal. The neuromorphic synapse system further comprises a spike timing dependent plasticity (STDP) circuit having a first gated signal path to integrate a pre-synaptic spike signal using a first leaky integrator, a second gated signal path to integrate a post-synaptic spike signal using a second leaky integrator, and an output integrator to integrate a difference between an output signal of the first gated signal path and an output signal of the second gated signal path. The integrated difference is the weight signal. The first gated signal path is gated according to the post-synaptic spike signal and the second gated signal path is gated according to the pre-synaptic spike signal.

In some examples, a method of providing spike timing dependent plasticity (STDP) processing of a first spike signal and a second spike signal is provided. The method of providing STDP processing comprises integrating the first spike signal using a leaky integrator to produce a first integrated signal and integrating the second spike signal using another leaky integrator to produce a second integrated signal. The method of providing STDP processing further comprises gating the first integrated signal according to the second spike signal to produce a gated first integrated signal and gating the second integrated signal according to the first spike signal to produce a gated second integrated signal. The method of providing STDP processing further comprises integrating a difference of the gated first integrated signal and the gated second integrated signal to produce a weighting signal.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Certain examples have other features that are one of in addition to and in lieu of the features illustrated in the above-referenced figures. These and other features are detailed below with reference to the above-referenced figures.

DETAILED DESCRIPTION

Examples consistent with the principles described herein provide spike timing dependent plasticity (STDP) processing of spike-based signals that may be used in conjunction with various neuromorphic circuits and systems. In particular, STDP processing may be used to implement a neuromorphic synapse as an interface between a pair of neuromorphic neurons, according to some examples. Synapse with STDP may be capable of reproducing key functional operating characteristics recognized in various biological synapses, for example. Further, some examples consistent with the principles described herein may be realized using inherently high energy-efficient circuits or equivalent implementations using asynchronous spike signal processing.

Spike timing dependent plasticity (STDP) is a characteristic that is observed in synapses in the brain that generally involves an adjustment of a strength of a connection or 'synapse' between a pair of neurons. The adjustment may be defined by an STDP learning rule that establishes a variation in a weighted response or synaptic conductance w, based on a time-difference (both positive and negative) or relative timing of input and output action potentials (i.e., spikes) at the synapse.

Figure 1:
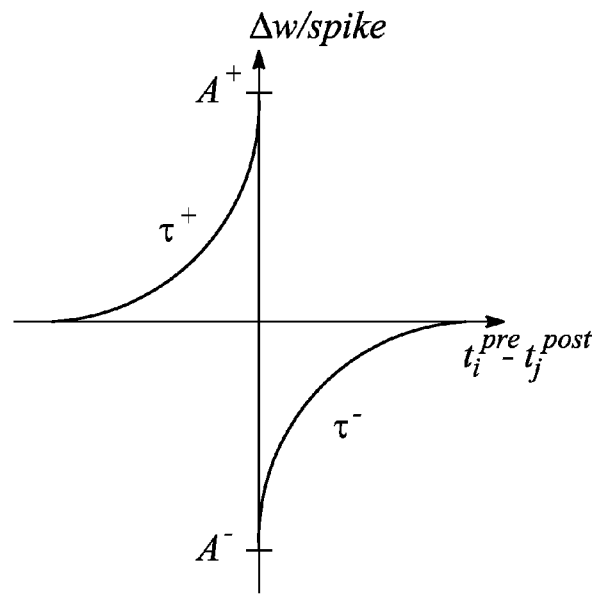
FIG. 1 illustrates a graph of a spike timing dependent plasticity (STDP) learning rule, according to an example consistent with the principles described herein.

FIG. 1 illustrates a graph of a spike timing dependent plasticity (STDP) learning rule, according to an example consistent with the principles described herein. The illustrated STDP learning rule or curve relates a change in a synaptic conductance or change in a synaptic weight $\Delta w$ of a synapse that connects a pair of neurons to a timing difference ($\Delta t_{i,j} = t_i^{pre} - t_j^{post}$) between the action potential of a pre-synaptic neuron ($t_i^{pre}$) and the action potential of a post-synaptic neuron ($t_j^{post}$). In particular, as defined by the STDP learning curve illustrated in FIG. 1, the synapse weight w, undergoes depression according to an exponential decay of the right half of the STDP learning curve when the timing difference $\Delta t_{i,j}$ is positive. Alternatively, in response to a negative timing difference $\Delta t_{i,j}$, the synapse undergoes potentiation according to an exponential decay of the left half of the STDP learning curve, as illustrated. The change or adjustment of the synaptic conductance w provided by the STDP learning rule may substantially mimic observed changes in synaptic conductance w associated with synapse between neurons in the brain, according to some examples.

As illustrated in FIG. 1, the STDP learning rule or curve has four parameters $A^+$, $A^-$, $\tau^+$ and $\tau^-$ that control a shape of the of the STDP learning curve. The first two parameters, a positive amplitude $A^+$ and a negative amplitude $A^-$, control a maximum change in the synaptic conductance $\Delta w$ associated respectively with potentiation and depression of the synapse response. Time decay constants $\tau^+$ and $\tau^-$ of the STDP learning curve set a decay rate for potentiation and depression, respectively. A further discussion of the STDP learning rule may be found in Song et al., "Competitive Hebbian Learning Through Spike-Timing Dependent Synaptic Plasticity," *Nature Neuroscience*, Vol. 3, 2000, pp. 919-926, for example.

Herein, a 'signal' is defined as a time varying quantity. Thus, a signal may be generally represented by a function of time t as S(t). However, in general herein, signals are represented without explicit reference to time for simplicity of notation and not by way of limitation. For example, the signal S(t) may be denoted or represented simply as 'S'.

A 'spike signal', also referred to as an action potential, is defined herein as a signal that comprises two states as a function of time (t). According to some examples, a first state of the two states is referred to as a low or 'OFF' state and a second state of the two states is referred to as a high or 'ON' state, in some examples. In various examples, the states may represent one or both of voltage or current values or levels. For example, the first state may be a first voltage (e.g., 0 millivolts (mV)) and the second state may be second voltage (e.g., 1 mV). Alternatively, the states may be represented by values of current such that the first state is a first current (e.g., 0 microamps ($\mu A$)) and the second state is a second current (e.g., 10 microamps ($\mu A$)). A spike signal in which the states are represented as voltage values may be referred as a 'voltage' spike signal. Similarly, a spike signal in which values of current represent the states may be referred to as a 'current' spike signal.

Further, a spike signal is generally characterized by being in or exhibiting one of the two states (e.g., the first or OFF state) for a majority of the time t with only brief transitions to the other state (e.g., the second or ON state), by definition herein. For example, the spike signal may exhibit a sequence of spikes of the ON state that are separated by relatively longer periods or inter-spike intervals (i.e., relative to a length of the spike) at the OFF state. According to various examples, a ratio of a length in time of a spike or 'spike time' to a length in time of an inter-spike interval or 'inter-spike interval time' is generally much less than one. In some examples, the ratio may be less than about 0.2. In some examples, the ratio is generally less than about 0.1 and may even be less than about 0.05. For example, the OFF state inter-spike interval time may be about 10 second (s) while the spike time of the ON state may have a length of about 1 second (s), for example. In another example, the ON state spike time may be about 0.1 s, while the OFF state inter-spike interval time between a pair of ON state spikes may be between about 1 s and about 10 s or more.

According to various examples, the spikes of the spike signal may be either aperiodic or periodic. For example, an aperiodic spike signal may comprise a series of spikes that occur at substantially random times or having substantially random inter-spike intervals. On the other hand, the spike signal may be a periodic spike signal that exhibits spikes at regular and repeating points in time. For example, a periodic spike signal may have a spike every 10 s. In another example, spikes may occur at intervals of about 5 s in another periodic spike signal. Such periodic spike signals are often said to have or exhibit a duty cycle. Herein, 'duty cycle' is defined in the usual sense as a ratio of a length of a spike to a time interval between spikes in a periodic spike signal.

Further, a periodic spike signal may be piece-wise or quasi-periodic as used herein. In particular, the periodic spike signal may be periodic for only a finite and relatively short period of time. For example, a periodic spike signal may comprise a sequence of five or ten spikes in a periodic sequence. In another example, a periodic spike signal may comprise a finite sequence of periodic spikes (e.g., 5 spikes) followed by a relatively long interval of no spikes that may be further followed by another finite sequence of periodic spikes. The other finite sequence of period spikes may have the same number (e.g., 5) or a different number (e.g., 6, 7, 8, . . . ) of spikes, for example. In other examples, a duty cycle or equivalently an inter-spike interval of spikes of a periodic spike signal may vary as a function of time.

In some examples, spikes of a spike signal (either aperiodic or periodic) may occur asynchronously. By 'asynchronously' it is meant by definition that timing of a spike in the spike signal is not determined or otherwise tied to a particular clock signal. In particular, spikes of a pair of spike signals may be asynchronous with respect to one another. Timing of the spikes in the pair of asynchronous spike signals is or may be substantially uncorrelated between the pair. As such, spikes of a first spike signal of the pair may occur at any time relative to spikes of a second spike signal of the pair since the pair of spike signals of the pair are not tied to or otherwise regulated by a master clock signal.

Herein, 'scaling' a signal is defined as multiplying the signal by a scalar value. Scaling generally affects a magnitude of the signal, by definition herein. For example, scaling a signal S by an arbitrary value P, with P being a scalar value, is equivalent to forming a multiplicative product P·S. Scaling may be provided by a gain block, according to some examples.

An amplifier with a specified gain or gain value g is an example of a gain block that may provide signal scaling. The gain g of the amplifier is applied by the amplifier to an amplitude of an input signal $S_{in}$, at an input of the amplifier to produce an output signal $S_{out}$ where the output signal $S_{out}$ equals the multiplicative product g times $S_{in}$, (e.g., $S_{out} = g \cdot S_{in}$). In general, the amplifier gain g may be positive or negative. An amplifier having negative gain is simply an amplifier having a gain value g that is less than zero (i.e., $-g$ where g is a positive integer), by definition herein.

Further herein, the terms 'gate' and 'gating' are employed and defined in the conventional sense with respect to an analog signal. In particular, a gate is a circuit or related structure that allows the analog signal to pass when the gate is enabled and substantially blocks passage of the analog signal when the gate is not enabled. A switch is an example of a gate that may be used for gating an analog signal.

Examples consistent with the principles described herein may be implemented using a variety of means including, but not limited to, integrated circuits (ICs), very large scale integrated (VLSI) circuits, application specific integrated circuits (ASIC), software and firmware. For example, elements or 'blocks' of an apparatus consistent with the principles described herein may all be implemented as circuit elements within an ASIC or a VLSI circuit. In another example, the apparatus may be implemented as software using a computer programming language (e.g., C/C++) or software-based modeling environment (e.g., Matlab) executed by a computer or similar processor. In yet another example, some of the blocks may be implemented using actual circuitry (e.g., as an IC or an ASIC) while other blocks may be implemented in software or firmware.

Further, as used herein, the article 'a' is intended to have its ordinary meaning in the patent arts, namely 'one or more'. For example, 'a signal' means one or more signals and as such, 'the signal' means 'the signal(s)' herein. Also, any reference herein to 'top', 'bottom', 'upper', 'lower', 'up', 'down', 'front', back', 'left' or 'right' is not intended to be a limitation herein. Herein, the term 'about' when applied to a value generally means within the tolerance range of the equipment used to produce the value, or in some examples, means plus or minus 20%, or plus or minus 10%, or plus or minus 5%, or plus or minus 1%, unless otherwise expressly specified. Moreover, examples herein are intended to be illustrative only and are presented for discussion purposes and not by way of limitation.

Figure 2:
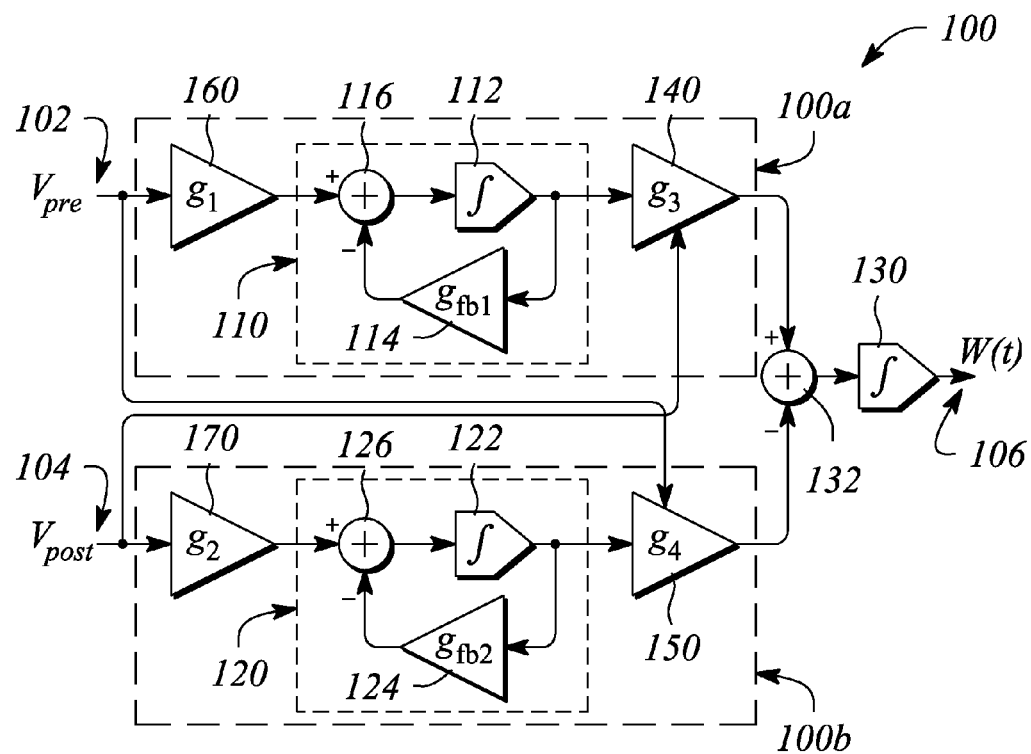
FIG. 2 illustrates a block diagram of a spike timing dependent plasticity (STDP) apparatus, according to an example consistent with the principles described herein.

FIG. 2 illustrates a block diagram of a spike timing dependent plasticity (STDP) apparatus 100, according to an example consistent with the principles described herein. The STDP apparatus 100 is configured to receive a first spike signal at a first input port 102 of the STDP apparatus 100. In some examples, the first spike signal is a voltage spike signal. In some examples (e.g., as illustrated), the first spike signal is referred to as a pre-synaptic signal $V_{pre}$. The STDP apparatus 100 is configured to also receive a second spike signal at second input port 104 of the STDP apparatus 100. In some examples, the second spike signal is also a voltage spike signal. In some examples (e.g., as illustrated), the second spike signal is referred to as a post-synaptic signal $V_{post}$.

The STDP apparatus 100 produces a weighted signal W(t) at an output port 106 of the STDP apparatus 100. In some examples, the weighted signal W(t) is a voltage-based signal (i.e., an amplitude of the signal comprises a voltage value or level). For example, the voltage-based signal may be an analog, continuous amplitude voltage-based signal. In continuous amplitude voltage-based signal, the weight signal may take on substantially any voltage between a minimum voltage and a maximum voltage, for example. In other examples, the voltage based weighted signal W(t) may be an analog, multilevel voltage-based signal having a plurality of discrete voltage levels. For example, at a particular time t, the weighted signal W(t) may take on one of ten discrete voltage values between a predetermined minimum voltage level and a predetermined maximum voltage level.

As illustrated in FIG. 2, the STDP apparatus 100 further comprises a first leaky integrator 110. In some examples, a leaky integrator (e.g., the first leaky integrator 110) may be implement as a low pass filter. The first leaky integrator 110 is configured to receive the first spike signal. The first leaky integrator 110 is further configured to convert the first spike signal into a decaying exponential signal at an output of the first leaky integrator 110. The decaying exponential signal at the output of the first leaky integrator 110 is gated to produce a first gated integrated signal. In various examples, gating of the first leaky integrator output is provided by or in accordance with the second spike signal.

The STDP apparatus 100 further comprises a second leaky integrator 120. The second leaky integrator 120 is configured to receive the second spike signal. The second leaky integrator 120 is further configured to convert the second spike signal into a decaying exponential signal at an output of the second leaky integrator 120. The decaying exponential signal at the output of the second leaky integrator 120 is gated to produce a second gated integrated signal. In various examples, gating of the second leaky integrator output is provided by or in accordance with the first spike signal.

According to some examples (as illustrated), the first and second leaky integrators 110, 120 each comprise an integrator 112, 122 and a feedback amplifier 114, 124. The feedback amplifiers 114, 124 each receive an output signal from a respective one of the integrators 112, 122 and produce a feedback signal. The feedback signal produced by the feedback amplifier 114 is subtracted from the first spike signal at an input of the first leaky integrator 110 prior to signal integration by the integrator 112 of the first leaky integrator 110. Similarly, the feedback signal produced by the feedback amplifier 124 is subtracted from the second spike signal at an input of the second leaky integrator 120 prior to signal integration by the integrator 122 of the second leaky integrator 110.

Subtraction of feedback signals from respective ones of the first and second spike signals may be provided by a summing circuit having a negative input (e.g., summing circuit 116 and summing circuit 126, respectively), as illustrated, for example. In another example, a gain $g_{fb}$ of the respective feedback amplifiers 114, 124 may be negative (e.g., $S_{out}=-g_{fb} \cdot S_{in}$ (not illustrated)) and the summing circuits 116, 126 may simply sum the feedback signals with the respective first and second spike signals.

The feedback gain $g_{fb}$, of the respective feedback amplifiers 114, 124 may be used to establish and control a time decay constant τ associated with an STDP learning rule of the STDP apparatus 100. For example, a feedback gain $g_{fb1}$ of the first leaky integrator 110 feedback amplifier 114 may be used to establish a positive time decay constant $τ^+$ of the STDP learning rule. In some examples, the first leaky integrator 110 feedback amplifier 114 feedback gain $g_{fb1}$ may be about 0.1. Similarly, a feedback gain $g_{fb2}$ of the second leaky integrator 120 feedback amplifier 124 may be used to establish a negative time decay constant $τ^-$ of the STDP learning rule. In some examples, the second leaky integrator 120 feedback amplifier 124 feedback gain $g_{fb2}$ may be about 0.1. In some examples, the feedback gains $g_{fb1}$, $g_{fb2}$ may be adjustable to facilitate changing the positive and negative decay constants $τ^+$, $τ^-$ in situ. In other examples, one or both of the gains feedback gains $g_{fb1}$, $g_{fb2}$ is a fixed, predetermined value.

According to some examples, a leaky integrator such as the first and second leaky integrators 110, 120 may be implemented using a resistor and a capacitor. For example, a shunt resistor in parallel with a shunt capacitor may be used to implement a leaky integrator when the STDP apparatus 100 is realized as an integrated circuit. A resistance value $R_1$ of the shunt resistor and a capacitance value $C_1$ of the shunt capacitor may be used to set the positive decay constant $τ^+$ when the shunt resistor and the shunt capacitor are used to implement the first leaky integrator 110, for example. In particular, a product of the resistance value $R_1$ and the capacitance value $C_1$ may determine the positive decay constant $τ^+$ (e.g., $τ^+=R_1 \cdot C_1$) when using the shunt resistor and the shunt capacitor to implement the first leaky integrator 110, for example. A resistance $R_1$ of about 100-400 (e.g., 200) kilo-Ohms (kΩ) and a capacitance $C_1$ of about 120-240 femtofarads (fF) may be used, for example.

Similarly, for example, a resistance value $R_2$ of a shunt resistor and a capacitance value $C_2$ of a shunt capacitor may be used to set the negative decay constant $τ^-$ when the shunt resistor and the shunt capacitor are used to implement the second leaky integrator 120. In particular, the negative decay constant $τ^-$ may be determined as a product of the resistance value $R_2$ and the capacitance value $C_2$ (e.g., $τ^-=R_2 \cdot C_2$), for example. In a particular example, a resistance $R_2$ of about 100-400 kΩ (e.g., 200 kΩ) and a capacitance $C_2$ of about 120-240 fF may be used. According to some examples, the shunt resistor may have a fixed resistance value producing a fixed and predetermined decay constant $τ^+$, $τ^-$, while in other examples the shunt resistor may have a programmable resistance facilitating adjustment of the decay constant $τ^+$, $τ^-$ in situ.

Referring again to FIG. 2, the STDP apparatus 100 further comprises an output integrator 130. The output integrator 130 is configured to integrate a difference of the first gated integrated signal and the second gated integrated signal to produce the weighted signal W(t). In some examples, a summing circuit 132 having a positive input and a negative input is employed between outputs of the leaky integrators 110, 120 and an input of the output integrator 130. The summing circuit 132 having positive and negative inputs subtracts the second gated integrated signal at the negative input from the gated first gated integrated signal at the positive input to produce the difference. The difference is then integrated by the output integrator 130. In other examples, an overall signal gain of a first signal path 100a of the STDP apparatus 100 that includes the first leaky integrator 110 is positive and an overall signal gain of a second signal path 100b of the STDP apparatus 100 that includes the second leaky integrator 120 is negative (i.e., the overall signal gains of the first and second signal paths 100a, 100b, respectively, have opposite polarities). In these examples, the difference may be provided by simply adding together the first and second gated integrated signals with a summing circuit.

According to some examples, the output integrator 130 may be a saturating integrator. For example, the saturating integrator is an integrator having an output signal that is limited or saturates at one or both of a predetermined maximum value and a predetermined minimum value. As such, an output signal of the saturating integrator may increase or decrease according to a transfer characteristic of the output integrator 130 (e.g., according to 1/s), but not beyond the predetermined maximum value and the predetermined minimum value, for example. In other examples, the output integrator 130 is a conventional or substantially non-saturating integrator.

In some examples, the STDP apparatus 100 further comprises a first gating circuit 140 at the output of the first leaky integrator 110. The first gating circuit 140 is configured to receive the second spike signal and to provided the gating of the first gated integrated signal according to the second spike signal. In some examples, the STDP apparatus 100 further comprises a second gating circuit 150 at an output of the second leaky integrator 120. The second gating circuit 150 is configured to receive the first spike signal and to provide the gating of the second gated integrated signal according to the first spike signal.

In some examples (e.g., as illustrated in FIG. 2), the first gating circuit 140 is a first gated transconductance amplifier 140 having a gain $g_3$ connected between the output of the first leaky integrator 110 and the input of the output integrator 130. The first gated transconductance amplifier 140 has a voltage input to receive a first integrated signal from the first leaky integrator 110, an enable input to receive the second spike signal, and a current output to produce the first gated integrated signal. As a transconductance amplifier, the first gated transconductance amplifier 140 converts a voltage-based signal (e.g., the first integrated signal) into a current-based signal (e.g., the first gated integrated signal) that is scaled by the gain $g_3$. In addition, the first gating transconductance amplifier 140 gates the first integrated signal received at the voltage input according to the second spike signal at the enable input. For example, when a spike is present in the second spike signal, the gating transconductance amplifier 140 produces a current-based signal at the current output that is proportional to the first integrated signal provided by the first leaky integrator 110. However, when a spike is absent in the second spike signal at the enable input, the gating transconductance amplifier 140 produces no output (i.e., the output current is about zero).

As a result, the first gated integrated signal is the current-based signal during time intervals corresponding to spikes in the second spike signal, and is zero otherwise. Further, the gain $g_3$ of the transconductance amplifier 140 establishes the proportionality of the current-based output signal and the first integrated signal. As such, during time intervals that correspond to spikes in the second spike signal, the first gated integrated signal has an amplitude of the first integrated signal during that time interval which is scaled by the gain $g_3$ of the first transconductance amplifier 140. Otherwise the gated first integrated signal is zero. Moreover, the first gated integrated signal is a spike signal with spike timing corresponding to the second spike signal.

In some examples (e.g., as illustrated in FIG. 2), the second gating circuit 150 is a second gated transconductance amplifier 150 connected between the output of the second leaky integrator 120 and the input of the output integrator 130. The second gated transconductance amplifier 150 has a gain $g_4$ and has a voltage input to receive a second integrated signal from the second leaky integrator 120, an enable input to receive the first spike signal, and a current output to produce the second gated integrated signal. The second gated transconductance amplifier 150 may be substantially similar to the first gated transconductance amplifier 140 but with the gain $g_4$. As a result, the second gated integrated signal is the second integrated signal in the form of a current-based signal during time intervals corresponding to spikes in the first spike signal, and is zero otherwise. Similarly, the second gated integrated signal has an amplitude that is scaled by the second transconductance amplifier gain $g_4$ during the spike time intervals of the first spike signal. As such, the second gated integrated signal is a spike signal with a spike timing corresponding to the first spike signal.

In some examples that include the first and second gated transconductance amplifiers 140, 150, the first and second gated integrated signals are summed by a wire junction. That is, the summing circuit 132 may comprise a pair of wires connected together, a first wire of the pair carrying the current-based first gated integrated signal and a second wire of the pair carrying the current-based second gated integrated signal. Further in these examples, the polarity difference that results in the subtraction of the second gated integrated signal from the first gated integrated signal may be provided by a polarity difference between the first signal path 100a and the second signal path 100b. Some or all of the polarity difference between the first signal path 100a and second signal path 100b may be provided by the transconductance amplifier gains $g_3$, $g_4$, according to some examples. For example, the second transconductance amplifier gain $g_4$ may be similar in magnitude but opposite in sign when compared to the first transconductance amplifier gain $g_3$ (e.g., $g_4 = -g_3$). In some examples, an absolute value of the transconductance amplifier gains $g_3$, $g_4$ may be used to either establish or at least contribute to a respective one of a positive amplitude $A^+$ and a negative amplitude $A^-$ of the STDP learning curve of the STDP apparatus 100, as will be discussed in more detail below.

In some examples, the STDP apparatus 100 further comprises a first input transconductance amplifier 160 connected between an input of the STDP apparatus 100 and an input of the first leaky integrator 110. The first input transconductance amplifier 160 is configured to scale or amplify the first spike signal. The first input transconductance amplifier 160 has a gain of $g_1$. According to various examples, the first input transconductance amplifier 160 is configured to operate in continuous time (i.e., the first input transconductance amplifier 160 is not gated) with gain $g_1$ and to convert the first spike signal from a voltage-based signal form to a current-based signal form. Further, the current-based signal form of the first spike signal generally has a non-zero value corresponding to a non-zero value of the voltage-based signal form of the first spike signal present at the input of the STDP apparatus 100 during a spike interval, and has a zero value otherwise. Moreover, the non-zero value is scaled by the gain $g_1$ of the first input transconductance amplifier 160.

In some examples, the STDP apparatus 100 further comprises a second input transconductance amplifier 170 having a gain $g_2$. The second input transconductance amplifier 170 is connected between a second input of the STDP apparatus 100 and an input of the second leaky integrator 120. The second input transconductance amplifier 170 is configured to amplify or scale the second spike signal according to the gain $g_2$ and further to convert the second spike signal from a voltage-based form to a current-based form. Except for the gain $g_2$, the second input transconductance amplifier 170 may be substantially similar to the first input transconductance amplifier 160, according to various examples.

In some examples, an absolute value of the input transconductance amplifier gains $g_1$, $g_2$ may be used to establish a respective one of the STDP amplitudes $A^+$, $A^-$ of the STDP learning curve of the STDP apparatus 100. For example, the first input transconductance amplifier gain $g_1$ may be used to set the overall gain of the first path 100a (e.g., when a magnitude of $g_3 = 1$ or may be so normalized). The overall gain of the first path 100a establishes the positive amplitude $A^+$ of the STDP learning curve, according to some examples. Similarly, the second input transconductance amplifier gain $g_2$ may be used to set the overall gain of the second path 100b (e.g., when a magnitude of $g_4 = 1$ or may be so normalized) and thus establish the negative amplitude $A^-$ of the STDP learning curve, according to some examples. In other examples, a combination of gains (e.g., $g_1$ and $g_3$ for the first path 100a and $g_2$ and $g_4$ for the second path 100b) is used to set the respective positive and negative amplitudes $A^+$, $A^-$ of the STDP learning curve. In these examples, each of the gains $g_1$ and $g_3$ contributes to the overall gain of the first signal path 100a and thus to the STDP learning curve amplitude $A^+$. Similarly, each of the gains $g_2$ and $g_4$ contributes to the overall gain of the second signal path 100b and thus to the STDP learning curve negative amplitude $A^-$. Other gains (e.g., a gain of the leaky integrators 110, 120) may also contribute to the STDP learning curve amplitudes $A^+$, $A^-$, according to some examples.

According to some examples, each of the gains $g_1$, $g_2$, $g_3$ and $g_4$ may be fixed, predetermined values. In other examples, one or more of the gains $g_1$, $g_2$, $g_3$ and $g_4$ may be programmable. For example, either fixed or programmable bias resistors of the respective ones of the transconductance amplifiers 140, 150, 160, 170 may be used to set the various gains $g_1$, $g_2$, $g_3$ and $g_4$.

In some examples, one or both of the input transconductance amplifiers 160, 170 are limiting transconductance amplifiers. A limiting amplifier is defined as an amplifier that establishes or 'limits' an output signal level to be less than a particular value (i.e., the limiting level). A limiting amplifier may be used to convert a spike signal having spike amplitudes that vary from one spike to a next spike into a spike signal have substantially equal amplitude spikes. The limiting transconductance amplifier is a transconductance amplifier that also acts as a limiting amplifier. The input transconductance amplifiers 160, 170 as limiting transconductance amplifiers may be configured to provide signal limiting of respective ones of the first and second spike signals such that all of the spikes in the first and second spike signals at an output of the input transconductance amplifiers 160, 170 have substantially equal amplitudes.

Figure 3A:
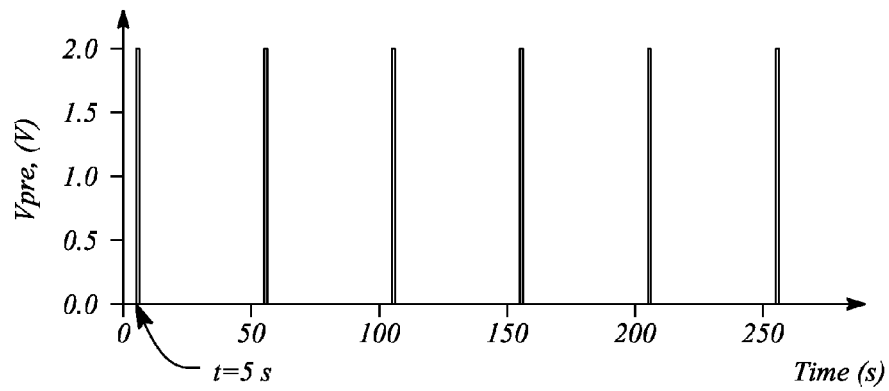
FIGS. 3A-3C illustrate graphs of an example of a relationship between signals at inputs and an output of an STDP apparatus, according to an example consistent with the principles described herein.
Figure 3B:
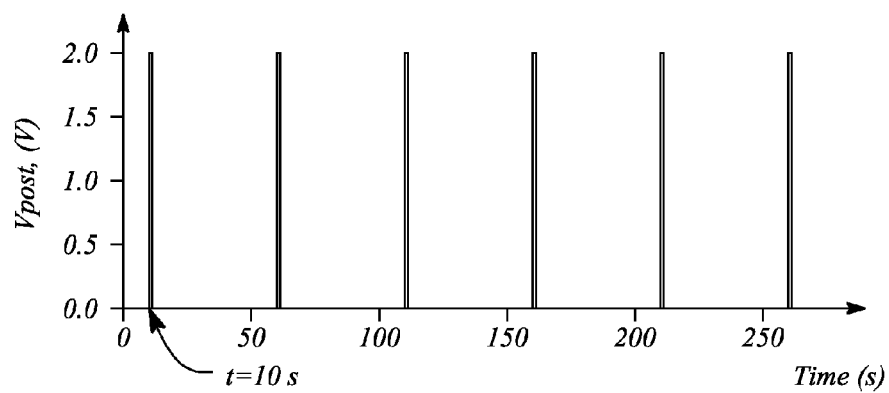
Figure 3C:
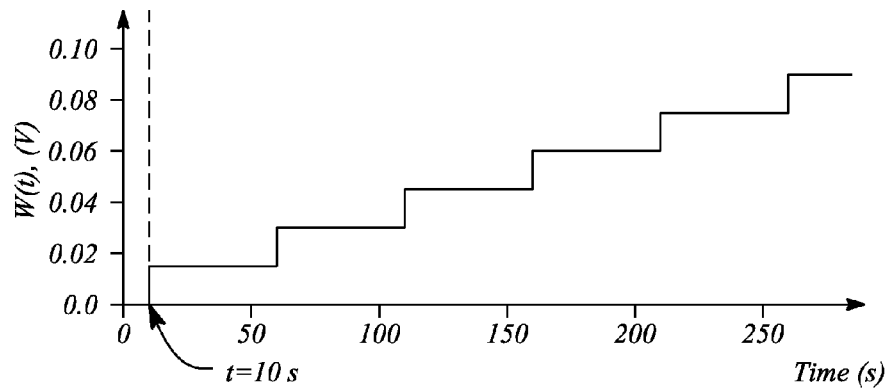

FIGS. 3A-3C illustrate an example of a relationship between signals at inputs and an output of an STDP apparatus, according to an example consistent with the principles described herein. In particular, FIG. 3A illustrates a plot of a waveform of an example pre-synaptic signal $V_{pre}$ as a function of time t. As illustrated, the example pre-synaptic signal $V_{pre}$ comprises a spike train or plurality of voltage spikes at intervals of 50 seconds (s) where each voltage spike has an amplitude of 2 volts (V). The example pre-synaptic signal $V_{pre}$ illustrated in FIG. 3A may represent the first spike signal at the first input of the STDP apparatus 100, for example.

FIG. 3B illustrates a plot of a waveform of an example post-synaptic signal $V_{post}$ as a function of time t. The example post-synaptic signal $V_{post}$ illustrated in FIG. 3B comprises a spike train or plurality of 2 V voltage spikes at intervals of 50 s. In addition, the voltage spikes of the post-synaptic signal $V_{post}$ are delayed by 5 s when compared to the voltage spikes of the pre-synaptic signal $V_{pre}$ illustrated in FIG. 3A. That is, the pre-synaptic signal $V_{pre}$ voltage spikes occur 5 s before corresponding voltage spikes of the post-synaptic signal $V_{post}$. The post-synaptic signal $V_{post}$ of FIG. 3B may represent the second spike signal at the second input of the STDP apparatus 100, for example.

FIG. 3C illustrates a plot of a waveform of an example weighted signal W(t) produced by the STDP apparatus 100 as a function of time t. In particular, the example weighted signal W(t) illustrated in FIG. 3C represents a signal that may be produced at the output of the STDP apparatus 100 in response to the example input spike trains of FIGS. 3A and 3B present at the inputs thereof. As illustrated, each successive pair of input voltage spikes (e.g., a pre-synaptic signal $V_{pre}$ voltage spike followed by a post-synaptic signal $V_{post}$ voltage spike) results in an increase in a level of the weighted signal W(t). The resultant level increases are consistent with the STDP learning curve, according to various examples.

Figure 4A:
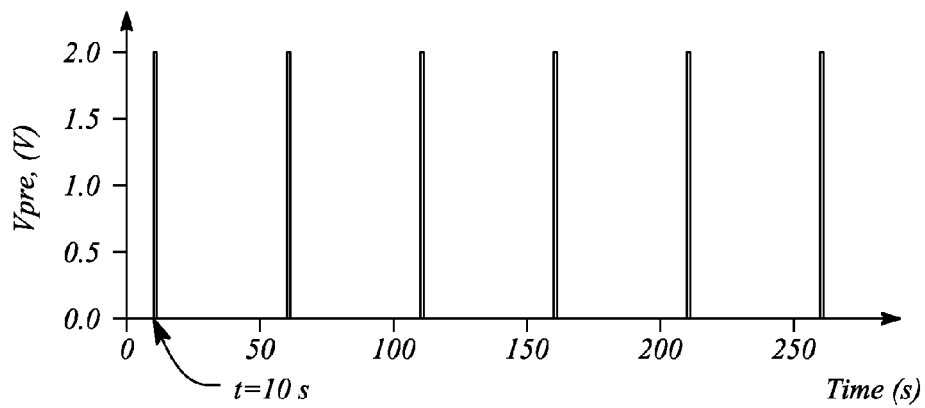
FIGS. 4A-4C illustrate graphs of another example of a relationship between signals at inputs and an output of an STDP apparatus, according to an example consistent with the principles described herein.
Figure 4B:
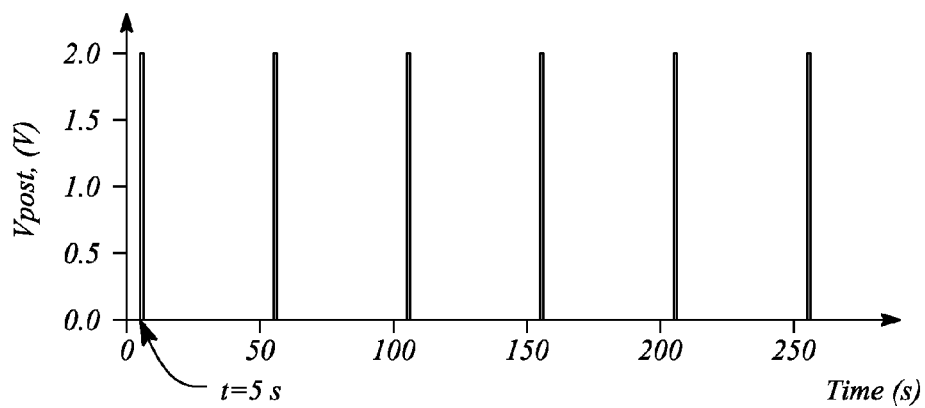
Figure 4C:
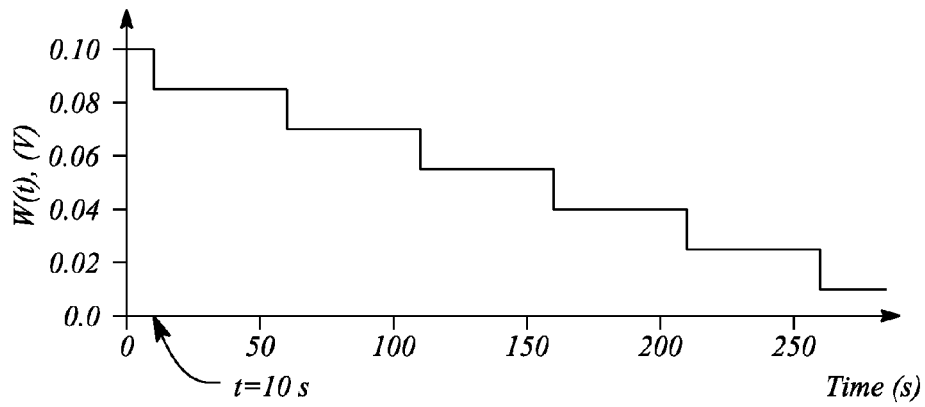

FIGS. 4A-4C illustrate another example of a relationship between signals at inputs and an output of an STDP apparatus, according to an example consistent with the principles described herein. In particular, FIG. 4A illustrates a plot of a waveform of another example pre-synaptic signal $V_{pre}$ spike train as a function of time t, while FIG. 4B illustrates a plot of a waveform of another example post-synaptic signal $V_{post}$ spike train as a function of time t. The spike train waveforms illustrated in FIGS. 4A and 4B are similar to the waveforms of FIGS. 3A and 3B, respectively, except that in FIGS. 4A and 4B voltage spikes of the pre-synaptic signal $V_{pre}$ are delayed by 5 s relative to voltage spikes of the post-synaptic signal $V_{post}$.

FIG. 4C illustrates a plot of a waveform of an example weighted signal W(t) produced by the STDP apparatus 100 as a function of time t. In particular, the example weighted signal W(t) illustrated in FIG. 4C represents a signal that may be produced at the output of the STDP apparatus 100 in response to the example input spike trains of FIGS. 4A and 4B present at the inputs thereof. As illustrated, each successive pair of input voltage spikes (e.g., a post-synaptic signal $V_{post}$ voltage spike followed by a pre-synaptic signal $V_{pre}$ voltage spike) results in a decrease in a level of the weighted signal W(t). The resultant level decreases are consistent with the STDP learning curve, according to various examples.

Figure 5:
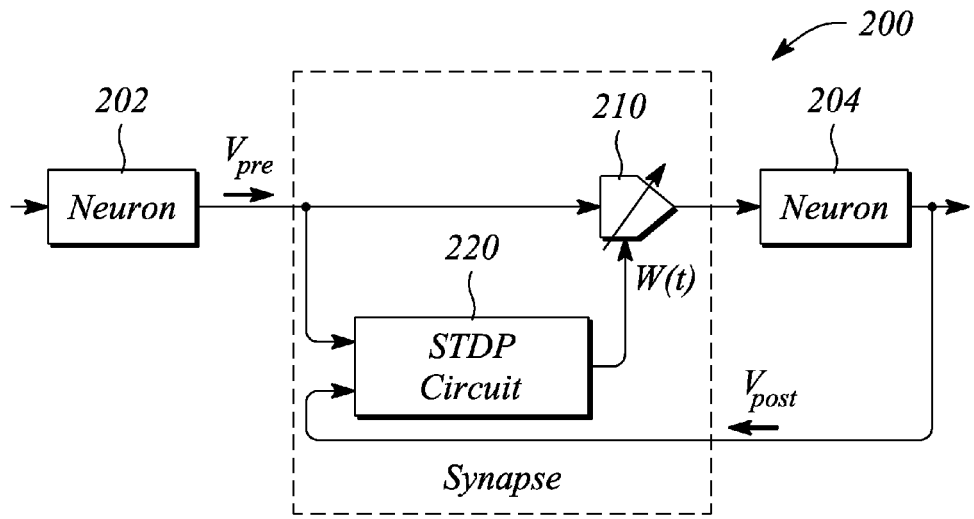
FIG. 5 illustrates a block diagram of a neuromorphic synapse system, according to an example consistent with the principles described herein.

FIG. 5 illustrates a block diagram of a neuromorphic synapse system 200, according to an example consistent with the principles described herein. In particular, the neuromorphic synapse system 200 may serve as a neuromorphic synapse that exhibits spike timing dependent plasticity (STDP), according to some examples. For example, the neuromorphic synapse system 200 may be a synapse that interfaces a first or pre-synaptic neuromorphic neuron 202 and a second or post-synaptic neuromorphic neuron 204, as illustrated. In such an arrangement, the pre-synaptic neuromorphic neuron 202 may provide a pre-synaptic spike signal $V_{pre}$ and the post-synaptic neuromorphic neuron 204 may provide a post-synaptic spike signal $V_{post}$, for example. In some examples, the pre-synaptic spike signal $V_{pre}$ is substantially similar to the first spike signal described above with respect to the STDP apparatus 100. In some examples, the post-synaptic spike signal $V_{post}$ is substantially similar to the second spike signal described above with respect to the STDP apparatus 100.

As illustrated, the neuromorphic synapse system 200 comprises a synapse core 210. The synapse core 210 is configured to receive a pre-synaptic spike signal and to produce a weighted spike signal. In some examples (as illustrated in FIG. 5), the pre-synaptic spike signal received by the synapse core 210 is the pre-synaptic signal $V_{pre}$ provided by the pre-synaptic neuromorphic neuron 202. In other examples, the pre-synaptic spike signal may be provided in part or in full by another circuit or system (not illustrated). According to various examples, the weighted spike signal that is produced by the synapse core 210 is weighted in accordance with a weight signal W(t). In some examples, the weight signal W(t) is substantially similar to the weight signal W(t), described above with respect to the STDP apparatus 100.

In some examples, the synapse core 210 comprises a 1-bit digital-to-analog converter (DAC) with adjustable gain. In various examples, the 1-bit DAC has a signal input, weight input and an output. In some examples, the 1-bit DAC of the synapse core 210 is configured to receive the pre-synaptic spike signal as a voltage spike train at the signal input. The 1-bit DAC is further configured to produce at the output the weighted spike signal. In some examples, the weighted spike signal is produced as a current spike train or equivalently as a current-based spike signal. According to various examples, the adjustable gain of the 1-bit DAC controls an amplitude value of spikes of the weighted spike signal. In particular, spikes in the weighted spike signal have timing that corresponds to timing of spikes in the pre-synaptic spike signal and amplitude values that are adjusted according to the weight signal W(t). In examples where the weighted spike signal is produced as a current spike train, the current spikes of the current spike train have amplitude values determined by the adjustable gain according to the weight signal W(t).

The neuromorphic synapse system 200 further comprises a spike timing dependent plasticity (STDP) circuit 220. The STDP circuit 220 has a first input to receive the pre-synaptic spike signal and a second input to receive a post-synaptic spike signal. In some examples (as illustrated in FIG. 5), the pre-synaptic spike signal received at the first input comprises the pre-synaptic signal $V_{pre}$ provided by the pre-synaptic neuromorphic neuron 202. In some examples (as illustrated), the post-synaptic spike signal received at the second input comprises the post-synaptic spike signal $V_{post}$ provided by the post-synaptic neuromorphic neuron 204. In other examples, one or both of the pre-synaptic spike signal and the post-synaptic spike signal received at the first input and the second input, respectively, may be provided in part or in full by another circuit or system (not illustrated). The STDP circuit 220 also has an output configured to produce the weight signal W(t). As illustrated, the output of the STDP circuit 220 is connected to the weight input of the 1-bit DAC of the synapse core 210.

In some examples, the STDP circuit 220 is substantially similar to the STDP apparatus 100, described above. In particular, according to various examples, the STDP circuit 220 comprises a first gated signal path to integrate the pre-synaptic spike signal using a first leaky integrator. The first signal path is connected to the first input at which the pre-synaptic spike signal is received, as illustrated. The first gated signal path is gated according to the post-synaptic spike signal, in various examples.

In some examples, the first gated signal path comprises the first leaky integrator that is substantially similar to the first leaky integrator 110 described above with respect to the STDP apparatus 100. In particular, the first leaky integrator may comprise a shunt resistor in parallel with a shunt capacitor, for example. In some examples, the first gated signal path further comprises an input transconductance amplifier connected between the first input of the STDP circuit 220 and an input of the first leaky integrator. The input transconductance amplifier of the first gated signal path may be substantially similar to the first input transconductance amplifier 160. In some examples, the first gated signal path further comprises a gated transconductance amplifier connected to an output of the first leaky integrator to receive and gate a first integrated signal produced by the first leaky integrator. The gated transconductance amplifier of the first gated signal path may be substantially similar to the first gated transconductance amplifier 140 of the STDP apparatus 100, described above. In some examples, a net gain of the first gated signal path is positive.

According to various examples, the STDP circuit 220 further comprises a second gated signal path to integrate the post-synaptic spike signal using a second leaky integrator. The second signal path is connected to the second input at which the post-synaptic spike signal is received, as illustrated. The STDP circuit 220 further comprises an output integrator. The second gated signal path is gated according to the pre-synaptic spike signal, in various examples.

In some examples, the second gated signal path comprises the second leaky integrator that is substantially similar to the second leaky integrator 120 described above with respect to the STDP apparatus 100. In particular, the second leaky integrator may comprise a shunt resistor in parallel with a shunt capacitor, for example. In some examples, the second gated signal path further comprises an input transconductance amplifier connected between the second input of the STDP circuit 220 and an input of the second leaky integrator. The input transconductance amplifier of the second gated signal path may be substantially similar to the second input transconductance amplifier 170. In some examples, the second gated signal path further comprises a gated transconductance amplifier connected to an output of the second leaky integrator to receive and gate a second integrated signal produced by the second leaky integrator. The gated transconductance amplifier of the second gated signal path may be substantially similar to the second gated transconductance amplifier 150 of the STDP apparatus 100, described above. In some examples, a net gain of the second gated signal path is negative.

According to various examples, the output integrator of the STDP circuit 220 is configured to integrate a difference between an output signal of the first gated signal path and an output signal of the second gated signal path. The integrated difference is the weight signal W(t), according to various examples. The output integrator is connected to the output of the STDP circuit 220 and the STDP circuit 220 output is connected to the weight input of the 1-bit DAC of the synapse core 210, as illustrated. In some examples, the output integrator is substantially similar to the output integrator 130 and summing circuit 132 described above with respect to the STDP apparatus 100.

According to some examples, the neuromorphic synapse system 200 further comprises the pre-synaptic neuron 202 (as illustrated) to provide the pre-synaptic spike signal to the synapse core and the STDP circuit. The neuromorphic synapse system 200 may further comprise the post-synaptic neuron 204 (as illustrated) to receive the weighted spike signal from the synapse core 210 and to produce the post-synaptic spike signal. The post-synaptic neuron 204 may also provide the post-synaptic signal to the STDP circuit 220, according to some examples.

Figure 6:
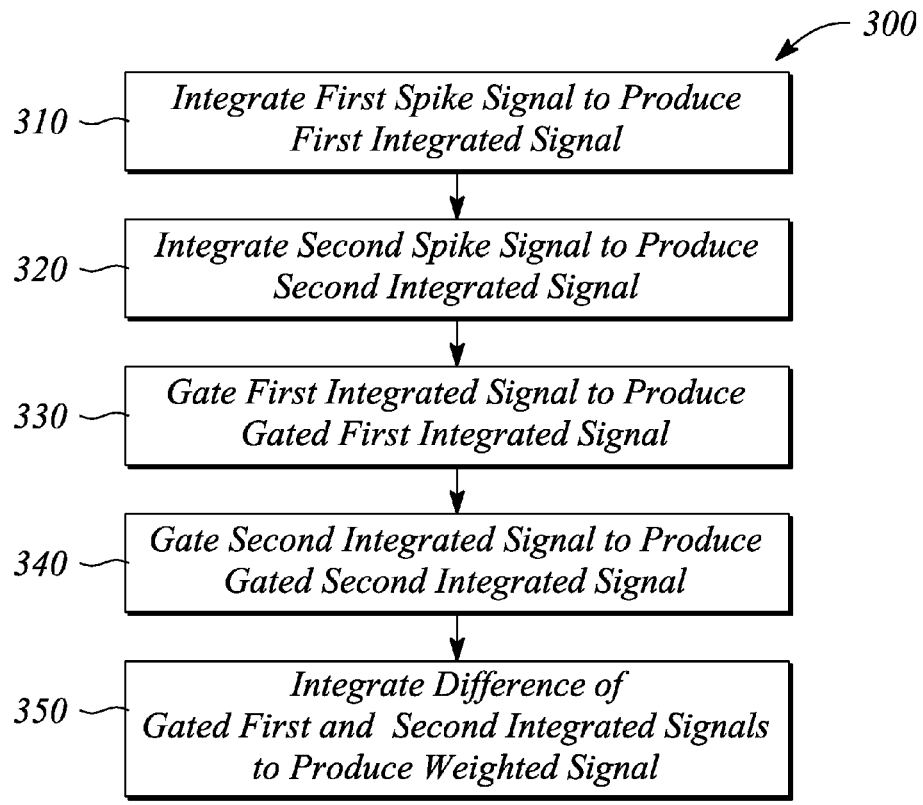
FIG. 6 illustrates a flow chart of a method of providing spike timing dependent plasticity (STDP) processing of a first spike signal and a second spike signal, according to an example consistent with the principles described herein.

FIG. 6 illustrates a flow chart of a method 300 of providing spike timing dependent plasticity (STDP) processing of a first spike signal and a second spike signal, according to an example consistent with the principles described herein. The method 300 of providing STDP processing comprises integrating 310 the first spike signal using a leaky integrator to produce a first integrated signal. The leaky integrator may be substantially similar to the first leaky integrator 110 described above with respect to the STDP apparatus 100, according to some examples. In particular, integrating 310 the first spike signal may be performed by the first signal path 100a of the STDP apparatus 100, for example.

The method 300 of providing STDP processing further comprises integrating 320 the second spike signal using another leaky integrator to produce a second integrated signal. The other leaky integrator may be substantially similar to the second leaky integrator 120 described above with respect to the STDP apparatus 100, according to some examples. In particular, integrating 320 the second spike signal may be performed by the second signal path 100b of the STDP apparatus 100, for example.

The method 300 of providing STDP processing further comprises gating 330 the first integrated signal according to the second spike signal to produce a gated first integrated signal. Gating 330 may be provided by the first gating circuit 140 described above with respect to the STDP apparatus 100, according to some examples. In particular, gating 330 may be performed using the first gated transconductance amplifier 140 of the first signal path 100a of the STDP apparatus 100 illustrated in FIG. 2. As such, the method 300 of providing STDP processing may further comprise using a first gated transconductance amplifier to provide the gating of the first integrated signal and to convert the first integrated signal from a voltage-based signal to a current-based signal, in some examples (not illustrated).

The method 300 of providing STDP processing further comprises gating 340 the second integrated signal according to the first spike signal to produce a gated second integrated signal. Gating 340 may be provided by the second gating circuit 150 described above with respect to the STDP apparatus 100, according to some examples. In particular, gating 340 may be performed using the second gated transconductance amplifier 150 of the second signal path 100b of the STDP apparatus 100 illustrated in FIG. 2. As such, the method 300 of providing STDP processing may further comprise using a second gated transconductance amplifier to provide the gating of the second integrated signal and to convert the second integrated signal from a voltage-based signal to a current-based signal, in some examples (not illustrated).

The method 300 of providing STDP processing further comprises integrating 350 a difference of the gated first integrated signal and the gated second integrated signal to produce a weighted signal. In some examples, integrating 350 may be performed using the output integrator 130 described above with respect to the STDP apparatus 100. The weighted signal may be substantially similar to the weighted signal W(t) described above with respect to the STDP apparatus 100, in some examples.

Further, the difference may be provided as described above with respect to the summing circuit 132 of the STDP apparatus 100. In particular, according to some examples, the current-based gated first integrated signal and the current-based gated second integrated signal are summed together prior to integrating 350 the difference. In some of these examples, an overall signal gain of a first signal path used in the method 300 of providing STDP processing has a polarity (e.g., positive) that is opposite that of a polarity (e.g., negative) of an overall signal gain of a second signal path used in the method 300 of providing STDP processing. The opposite polarities may provide the difference of the first integrated signal and the second integrated signal when current-based gated first and second integrated signals are summed, for example. In another example, a summing circuit having a positive and a negative input may produce the difference of the first and second gated integrated signals from a pair of signal paths having overall signal gains with the same polarities.

In some examples, the method 300 of STDP processing further comprises amplifying the first spike signal using a transconductance amplifier prior to integrating the first spike signal with the leaky integrator. According to some examples, a transconductance amplifier that is substantially similar to the first input transconductance amplifier 160, may be used to amplify the first spike signal. In some examples, the method 300 of STDP processing further comprises amplifying the second spike signal using another transconductance amplifier prior to integrating 320 the second spike signal with the other leaky integrator.

In some examples (not explicitly illustrated in FIG. 6), the method 300 of STDP processing further comprises providing the first spike signal using a pre-synaptic neuromorphic neuron, wherein the first spike signal is a pre-synaptic signal. In some examples (not explicitly illustrated in FIG. 6), the method 300 of STDP processing further comprises processing the pre-synaptic signal using a synapse core to produce an output spike signal that is weighted according to the weighting signal. In some examples (not explicitly illustrated in FIG. 6), the method 300 of STDP processing further comprises receiving the output spike signal with a post-synaptic neuromorphic neuron to produce a post-synaptic signal, wherein the post-synaptic signal is the second spike signal.

Thus, there have been described examples of a spike timing dependent plasticity apparatus, an neuromorphic synapse system that exhibits spike timing dependent plasticity and a method of spike signal processing that provides spike timing dependent plasticity. It should be understood that the above-described examples are merely illustrative of some of the many specific examples that represent the principles consistent with the principles described herein. Clearly, those skilled in the art can readily devise numerous other arrangements without departing from the scope consistent with the principles described herein as defined by the following claims.

What is claimed is:

1. A spike timing dependent plasticity (STDP) apparatus comprising:
 a first input transconductance amplifier to receive and amplify a first spike signal;
 a first leaky integrator connected to an output of the first input transconductance amplifier to receive and integrate the amplified first spike signal, an output of the first leaky integrator being gated to produce a first gated integrated signal;
 a second input transconductance amplifier to receive and amplify a second spike signal;
 a second leaky integrator connected to an output of the second input transconductance amplifier to receive and integrate the amplified second spike signal, an output of the second leaky integrator being gated to produce a second gated integrated signal; and
 an output integrator to integrate a difference of the first gated integrated signal and the second gated integrated signal to produce a weighted signal at an output of the STDP apparatus,
 wherein the first leaky integrator output is gated according to the second spike signal and the second leaky integrator output is gated according to the first spike signal, and wherein one or more of the first leaky integrator, the second leaky integrator and the output integrator is implemented using a physical circuit.

2. The STDP apparatus of claim 1, further comprising:
 a first gated transconductance amplifier connected between the output of the first leaky integrator and an input of the output integrator and having an input connected to receive the second spike signal, the first gated transconductance amplifier to gate the first leaky integrator output according to the received second spike signal; and
 a second gated transconductance amplifier connected between the output of the second leaky integrator and the input of the output integrator and having an input connected to receive the first spike signal, the second gated transconductance amplifier to gate the second leaky integrator output according to the received first spike signal.

3. The STDP apparatus of claim 2, further comprising a summing circuit having a positive input and a negative input connected to respective outputs of the first gated transconductance amplifier of a first signal path and the second gated transconductance amplifier of a second signal path and having a summing circuit output connected to an input of the output integrator, wherein output signals of both the first gated transconductance amplifier and the second gated transconductance amplifier are current-based signals to be summed together prior to being integrated by the output integrator, and wherein an overall signal gain of the first signal path has a polarity that is opposite an overall signal gain of the second signal path, the opposite polarities providing the difference of the first gated integrated signal and the second gated integrated signal.

4. The STDP apparatus of claim 1, wherein a feedback gain of the first leaky integrator is about 0.1, and wherein a feedback gain of the second leaky integrator is about 0.1.

5. The STDP apparatus of claim 1, wherein one or both of the first leaky integrator and the second leaky integrator comprises a shunt resistor in parallel with a shunt capacitor.

6. The STDP apparatus of claim 1, wherein one or both of the first input transconductance amplifier and the second input transconductance amplifier is a limiting transconductance amplifier to provide signal limiting of a respective one or both of the first spike signal and the second spike signal.

7. A synapse of a neuromorphic system comprising the STDP apparatus of claim 1, the synapse further comprising:
 a synapse core comprising a 1-bit digital to analog converter (DAC) having a weight input to receive the weighted signal from the STDP apparatus and an output connected to a synapse output, the synapse core to receive the first spike signal and to produce a spike signal weighted according to the weighted signal at the weight input.

8. The synapse of a neuromorphic system of claim 7, further comprising:
 a pre-synaptic neuromorphic neuron to produce a pre-synaptic signal, the pre-synaptic signal being the first spike signal; and
 a post-synaptic neuromorphic neuron to receive the weighted spike signal at the synapse output, the post-synaptic neuromorphic neuron to produce a post-synaptic signal, the post-synaptic signal being the second spike signal.

9. A neuromorphic synapse system comprising:
 a synapse core to receive a pre-synaptic spike signal and to produce a weighted spike signal, the weighted spike signal being weighted in accordance with a weight signal, wherein the synapse core comprises a 1-bit digital-to-analog converter (DAC) with adjustable gain; and a spike timing dependent plasticity (STDP) circuit comprising a first gated signal path to amplify the pre-synaptic signal using an input transconductance amplifier and to integrate the amplified pre-synaptic spike signal using a first leaky integrator, a second gated signal path to amplify a post-synaptic spike signal using another input transconductance amplifier and to integrate the amplified post-synaptic spike signal using a second leaky integrator, and an output integrator to integrate a difference between an output signal of the first gated signal path and an output signal of the second gated signal path, the integrated difference being the weight signal, wherein the first gated signal path is gated according to the post-synaptic spike signal, and wherein the second gated signal path is gated according to the pre-synaptic spike signal.

10. The neuromorphic system of claim 9, wherein the 1 bit digital-to-analog converter (DAC) with adjustable gain is to receive the pre-synaptic spike signal as a voltage spike train and to produce the weighted spike signal as a current spike train, and wherein current spikes of the current spike train have amplitude values determined by the adjustable gain according to the weight signal.

11. The neuromorphic synapse system of claim 9, wherein the first gated signal path comprises:

the first leaky integrator;

the input transconductance amplifier connected to an input of the first leaky integrator; and a gated transconductance amplifier connected to an output of the first leaky integrator to receive and to gate a first integrated signal produced by the first leaky integrator, wherein a net gain of the first gated signal path is positive.

12. The neuromorphic synapse system of claim 9, wherein the second gated signal path comprises:

the second leaky integrator;

the other input transconductance amplifier connected to an input of the second leaky integrator; and a gated transconductance amplifier connected to an output of the second leaky integrator to receive and to gate a second integrated signal produced by the second leaky integrator, wherein a net gain of the second gated signal path is negative.

13. The neuromorphic synapse system of claim 9, wherein one or both of the first leaky integrator and the second leaky integrator comprises a shunt resistor in parallel with a shunt capacitor.

14. The neuromorphic synapse system of claim 9, further comprising:

a pre-synaptic neuron circuit to provide the pre-synaptic spike signal to the synapse core and the STDP circuit; and a post-synaptic neuron circuit to receive the weighted spike signal from the synapse core and to produce the post-synaptic spike signal, the post-synaptic signal to be provided to the STDP circuit.

15. A method of providing spike timing dependent plasticity (STDP) processing of a first spike signal and a second spike signal, the method comprising:

amplifying the first spike signal using a transconductance amplifier;

integrating the amplified first spike signal using a leaky integrator to produce a first integrated signal;

amplifying the second spike signal using another transconductance amplifier;

integrating the amplified second spike signal using another leaky integrator to produce a second integrated signal;

gating the first integrated signal according to the second spike signal to produce a gated first integrated signal;

gating the second integrated signal according to the first spike signal to produce a gated second integrated signal; and integrating a difference of the gated first integrated signal and the gated second integrated signal to produce a weighted signal.

16. The method of providing STDP processing of claim 15, wherein gating the first integrated signal comprises: using a first gated transconductance amplifier to provide the gating of the first integrated signal, the first gated transconductance amplifier to convert the first integrated signal from a voltage-based signal to a current-based signal of a first signal path; and wherein gating the second integrated signal comprises using a second gated transconductance amplifier to provide the gating of the second integrated signal, the second gated transconductance amplifier to convert the second integrated signal from a voltage-based signal to a current-based signal of a second signal path.

17. The method of providing STDP processing of claim 16, further comprising summing together the current-based gated first integrated signal and the current-based gated second integrated signal prior to integrating the difference, wherein an overall signal gain of the first signal path that produces the current-based gated first integrated signal has a polarity that is opposite a polarity of an overall signal gain of the second signal path that produces the current-based gated second integrated signal, the opposite polarities providing the difference of the gated first integrated signal and the gated second integrated signal.

18. The method of providing STDP processing of claim 15, further comprising:

providing the first spike signal using a pre-synaptic neuromorphic neuron, the first spike signal being a pre-synaptic signal;

processing the pre-synaptic signal using a synapse core to produce an output spike signal that is weighted according to the weighting signal; and receiving the output spike signal with a post-synaptic neuromorphic neuron to produce a post-synaptic signal, the post-synaptic signal being the second spike signal.

19. A neuromorphic synapse system comprising:

a synapse core to receive a pre-synaptic spike signal and to produce a weighted spike signal, the weighted spike signal being weighted in accordance with a weight signal; and a spike timing dependent plasticity (STDP) circuit comprising:

a first gated signal path to amplify the pre-synaptic spike signal using an input transconductance amplifier and to integrate the amplified pre-synaptic spike signal using a first leaky integrator;

a second gated signal path to amplify a post-synaptic spike signal using another input transconductance amplifier and to integrate the amplified postsynaptic spike signal using a second leaky integrator; and an output integrator to integrate a difference between an output signal of the first gated signal path and an output signal of the second gated signal path, the integrated difference being the weight signal, wherein the first gated signal path is gated according to the post-synaptic spike signal, and wherein the second gated signal path is gated according to the presynaptic spike signal.

20. The neuromorphic synapse system of claim 19, wherein the first gated signal path comprises:
- the first leaky integrator;
- the input transconductance amplifier connected to an input of the first leaky integrator; and
- a gated transconductance amplifier connected to an output of the first leaky integrator to receive and to gate a first integrated signal produced by the first leaky integrator, wherein a net gain of the first gated signal path is positive.

21. The neuromorphic synapse system of claim 19, wherein the second gated signal path comprises:
- the second leaky integrator;
- the other input transconductance amplifier connected to an input of the second leaky integrator; and
- a gated transconductance amplifier connected to an output of the second leaky integrator to receive and to gate a second integrated signal produced by the second leaky integrator, wherein a net gain of the second gated signal path is negative.

\* \* \* \* \*